(12) United States Patent
Thorley et al.

(10) Patent No.: US 10,708,277 B2
(45) Date of Patent: Jul. 7, 2020

(54) ARTIFICIAL INTELLIGENCE FOR A VEHICLE SERVICE ECOSYSTEM

(71) Applicant: Bosch Automotive Service Solutions Inc., Warren, MI (US)

(72) Inventors: Simon Thorley, South Lyon, MI (US); Diwakar Sathyanarayanan, Canton, MI (US); Shawn Dupuie, Maybee, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 307 days.

(21) Appl. No.: 15/910,469

(22) Filed: Mar. 2, 2018

(65) Prior Publication Data

US 2019/0272362 A1 Sep. 5, 2019

(51) Int. Cl.
*H04L 29/06* (2006.01)
*G06Q 10/00* (2012.01)
*G06F 21/32* (2013.01)
*H04L 9/32* (2006.01)

(52) U.S. Cl.
CPC ............ *H04L 63/105* (2013.01); *G06F 21/32* (2013.01); *G06Q 10/20* (2013.01); *H04L 9/3231* (2013.01); *H04L 63/0861* (2013.01); *H04L 9/32* (2013.01); *H04L 63/107* (2013.01); *H04L 63/20* (2013.01)

(58) Field of Classification Search
CPC ..... G06F 21/32; H04L 63/081; H04L 63/105; H04L 63/107; H04L 63/12; H04L 63/20; H04L 9/32; H04L 9/3226; H04L 9/3231; G06Q 10/20
See application file for complete search history.

(56) References Cited

U.S. PATENT DOCUMENTS

| | | | |
|---|---|---|---|
| 2003/0055535 A1* | 3/2003 | Voeller | G10L 15/26 700/279 |
| 2007/0244611 A1* | 10/2007 | Brozovich | G07C 5/008 701/31.5 |
| 2016/0171806 A1* | 6/2016 | Van Dyken | H04R 3/005 367/199 |

\* cited by examiner

*Primary Examiner* — Kristine L Kincaid
*Assistant Examiner* — Shaqueal D Wade
(74) *Attorney, Agent, or Firm* — BakerHostetler

(57) ABSTRACT

A service ecosystem for vehicles that includes various components that are connected to a cloud. One or more technicians wearing headsets can be verified and authenticated by the cloud to work on vehicles based on the technician's biometric information and on the vehicle service requested. The service ecosystem may provide instructions to the technicians to perform the vehicle service. The cloud may also provide requested technical service information to the technician and a service advisor and help to load balance technician so that the service can be completed as scheduled.

20 Claims, 5 Drawing Sheets

EXPRESS SERVICE - OIL CHANGE AND TIRE ROTATION - 2 MAN TEAM. THIS WAS A "WALK-IN" CUSTOMER

TECHNICIAN A (TA) AND B (TB) BOTH WEARING THE HEADSETS

| | WHO | DESCRIPTION | ACTION |
|---|---|---|---|
| 502 | TA TO BEST | LOG INTO THE CLOUD BASED SYSTEM | "TECH 612A HERE" |
| 504 | BEST TO TA | SECURITY CHECK AND VERIFICATION | "MORNING JOHN, READY TO GO" |
| 506 | TB TO BEST | LOG INTO THE CLOUD BASED SYSTEM | "TECH 324B LOGGING IN" |
| 508 | BEST TO TB | SECURITY CHECK AND VERIFICATION | "MORNING MELAINIE, WE ARE READY TO GO" |
| 510 | TA TO BEST | INITIATE THE WORK SEQUENCE AND IDENTIFY THE VEHICLE | "EXPRESS SERVICE BASIC" "VIN 1VT34E265AWC34" |
| 512 | BEST TO TA, TB | CONFIRMATION THAT THE SERVICE IS SETUP AND THAT THE PROCESS CAN BEGIN | "VEHICLE SUBARU IMPREZA WRC - 2016 MY" |
| 514 | BEST TO TA | SERVICE STARTS ON THE VEHICLE | "CHECK THE FRONT WIPERS" |
| 516 | BEST TO TB | SERVICE STARTS ON THE VEHICLE | "CHECK THE REAR WIPER" |
| 518 | TA TO BEST | FEEDBACK ON THE SERVICE STEP | "FRONT WIPERS, GOOD" |
| 520 | TB TO BEST | FEEDBACK ON THE SERVICE STEP | "REAR WIPER, WORN" |
| 522 | BEST TO TB | MORE DETAIL | "PLEASE TAKE A PICTURE OF THE WORN WIPER" |
| 524 | TA TO BEST | DRIVERS FRONT BRAKE PAD CHECK | "DRIVERS FRONT BRAKE PAD READING 2/16" PHOTO TAKEN." |
| 526 | BEST TO SA | ISSUE NOTIFICATION | "EXPRESS SERVICE. RO#3429 REQUIRES CUSTOMER APPROVAL TO PROCEED" |
| 528 | SA | REVIEW ISSUE | "OPEN RO#3429 NOTIFICATIONS ON MY IPAD" |
| 530 | CUSTOMER | REVIEW ISSUE | CUSTOMER SELECTS "APPROVE" |
| 532 | SA | REVIEW ISSUE | |
| 534 | BEST TO TA | FRONT BRAKE PAD REPLACEMENT APPROVE | "REPLACE FRONT BRAKES" |
| 536 | BEST TO TA, TB | JOB IN BAY COMPLETED | "JOB COMPLETED IN 38MINS, GREAT JOB GETTING THE BRAKE PAD REPLACEMENT" |
| 538 | TA | VEHICLE RETURNED TO CUSTOMER HOLDING AREA | |
| 540 | BEST TO CUSTOMER | CUSTOMER PICKS UP THE VEHICLE | |

FIG. 5

ARTIFICIAL INTELLIGENCE FOR A VEHICLE SERVICE ECOSYSTEM

TECHNICAL FIELD

The disclosure relates generally to vehicle service. In particular, the disclosure relates to a vehicle service ecosystem.

BACKGROUND

Vehicles range from automobiles to airplanes require vehicle service such as routine maintenance, vehicle diagnosis or vehicle repair and the like. Vehicle service requires both down time for the vehicles and the customers. Customers tend to be impatient with these down times and demand to know precisely when their vehicles will be ready and how much it will cost. Further, fleet managers also would like to be able to schedule the vehicles for use in the field but must take into account vehicle service down time of the vehicles. Thus, their business demands accuracy in terms of available vehicles so that they are able to schedule properly to meet their customer's delivery deadlines. If they are not kept well-informed as to vehicle service time and costs including unexpected costs, these customers and fleet managers will move their business to another service center without any hesitation.

Customers such as a driver, owner or fleet manager of the vehicle generally arrive at a service center in two ways. 1. Customer drives up to the service center without an appointment. 2. Customer would call a service center or go online to make an appointment. In both instances, the customer would discuss the vehicle service required with a service advisor who would generally estimate the time it would take and cost. However, the estimate will usually be based on the general experience of the service advisor but does not take into account the availability of the technicians including certified technicians that may or may not be available, the availability of the repair bay, or whether the parts needed for the repair are available. Thus, the customer may be informed that he could get his vehicle back the same day but in actuality, the vehicle would not be ready until the next day due to factors that the service advisor did not take into account when he made the estimate.

Thus, a service advisor should have access to all available information in order to provide an accurate vehicle service time and cost estimate and also be kept well informed of any delays in the vehicle service or if unexpected issues arise. Typically, technicians perform vehicle routine maintenance by following a checklist (multi point inspection) or standard service process (e.g. oil change, tire rotation) using paper or electronic devices without any feedback such as being behind schedule for the service being provided. Even with a checklist, it is difficult for a technician to know if he is behind schedule and to what extent. For example, the technician may know at this point in time, he should be at step 10 of the 20 point maintenance inspection instead of step 8 but he might not know how long it would take him to complete steps 11 through 20 in order to update the service advisor or that he may need additional help either in the form of an additional technician (similar credentials) or a specialized technician (master mechanic) in order to complete vehicle routine maintenance. Further, should unexpected repairs be identified during the inspection, the service advisor would need to know the expected repair costs, availability of technicians and any parts as well as the expected time to repair in order to relay that information to the customer for approval. The situation described is even more complex when you consider vehicle diagnostic, which is to ascertain repair procedures since the root cause of the reported symptom has not been identified and therefore the repair is not known. When vehicle diagnostic is performed, the technician will have some basic procedures to follow but at times, the technician will be using his skills and experience to resolve the issue reported. This can take time and be inefficient since the diagnosis may not have been performed previously.

Thus, there is a need for a service ecosystem related to vehicle service that provides accurate estimates for: time to complete, costs, available parts and resources that allow for a service process flow (discussed below) to be optimized. A service advisor or customer would be made aware at all time of the specific details. A customer would approve any work before it is done. Additionally there is a need for a system that can help with vehicle diagnostic learning building on knowledge as collected through different sources.

BRIEF SUMMARY

In one aspect, the disclosure is directed to a service ecosystem for vehicle service, which can comprise a first and second head set each including a microphone, an ear piece, glasses, a camera and a wireless communication interface, where in the glasses includes a display that displays information, a distributed network that communicates with the first and second head set, wherein the distributed network includes vehicle diagnostic databases including repair and maintenance instructions, and technician information including vehicle service certification level and performance efficiencies for various vehicle repair services, and wherein the distributed network includes a diagnostic processor that is configured to receive a first biometric data of a first technician from the first head set, receive a second biometric data of a second technician from the second head set, confirm the first and second technician's respective identification and respective vehicle service certification level to perform a scheduled service on the vehicle based on the first and second biometric data, provide vocal step by step instructions for the scheduled service via the ear piece or visual step by step instructions for the scheduled service via the display to the first and second technician to perform a scheduled service procedure, wherein a step is assigned to a respective technician based on the vehicle service certification level and an efficiency level of the respective technician for that step, receive confirmation from the first technician that a first step of the scheduled service procedure has been completed, determine whether a second step of the scheduled service procedure has been completed by the second technician, if second step is not completed, reallocate the second step to the first technician, determine if the scheduled service procedure will be completed within a predetermined time, if the scheduled service procedure will not be completed within the predetermined time, request a third technician to assist with the scheduled service procedure or load balance between the first and the second technician by sending or reassigning an assigned step, and provide a notification if the scheduled service procedure will not be completed in time despite the load balance of the steps in the service procedure.

In another aspect, the disclosure is directed to a method of servicing a vehicle, which can comprise the steps of receiving, via a diagnostic processor of a distributed network, a first biometric data of a first technician from a first head set, receiving, via the diagnostic process of the distributed network, a second biometric data of a second technician from a second head set, wherein the first and second head set each including a microphone, an ear piece, glasses, a camera and a wireless communication interface, where in the glasses includes a display that displays information, confirming with the diagnostic processor of the distributed network linked to technician information, the first and second technician's respective identification and respective vehicle service certification level to perform a scheduled service on the vehicle based on the first and second biometric data, providing, via the diagnostic processor of the distributed network, vocal step by step instructions for the scheduled service via the ear piece or visual step by step instructions for the scheduled service via the display to the first and second technician to perform a scheduled service procedure, wherein a step is assigned to a respective technician based on the vehicle service certification level and an efficiency level of the respective technician for that step, receiving, via the diagnostic processor of the distributed network, confirmation from the first technician through the first head set that a first step of the scheduled service procedure has been completed, determining, via the diagnostic processor of the distributed network, whether a second step of the scheduled service procedure has been completed by the second technician, if second step is not completed, reallocating, via the diagnostic processor of the distributed network, the second step to the first technician, determining, via the diagnostic processor of the distributed network, if the scheduled service procedure will be completed within a predetermined time, if the scheduled service procedure will not completed within the predetermined time, requesting, via the diagnostic processor of the distributed network, a third technician to assist with the scheduled service procedure or load balance between the first and the second technician by sending or reassigning an assigned step, and providing, via the diagnostic processor of the distributed network, a notification if the scheduled service procedure will not be completed in time despite the load balance of the steps in the service procedure.

BRIEF DESCRIPTION OF THE DRAWINGS

FIG. 5 illustrates a servicing method using the service ecosystem according to an embodiment of the disclosure.

DETAILED DESCRIPTION

The disclosure sets forth a process and system for vehicle service that provides the necessary information to all stakeholders in the service ecosystem (e.g. service advisor, original equipment advisor, technician, customer, fleet service manager) so that the vehicle service can be performed within the estimated time and estimated costs and by the right level of certified technician in an optimal manner. The vehicle can be any type of vehicle including train, truck, van airplane, ship, automobile, motorcycle and the like.

Figure 1:
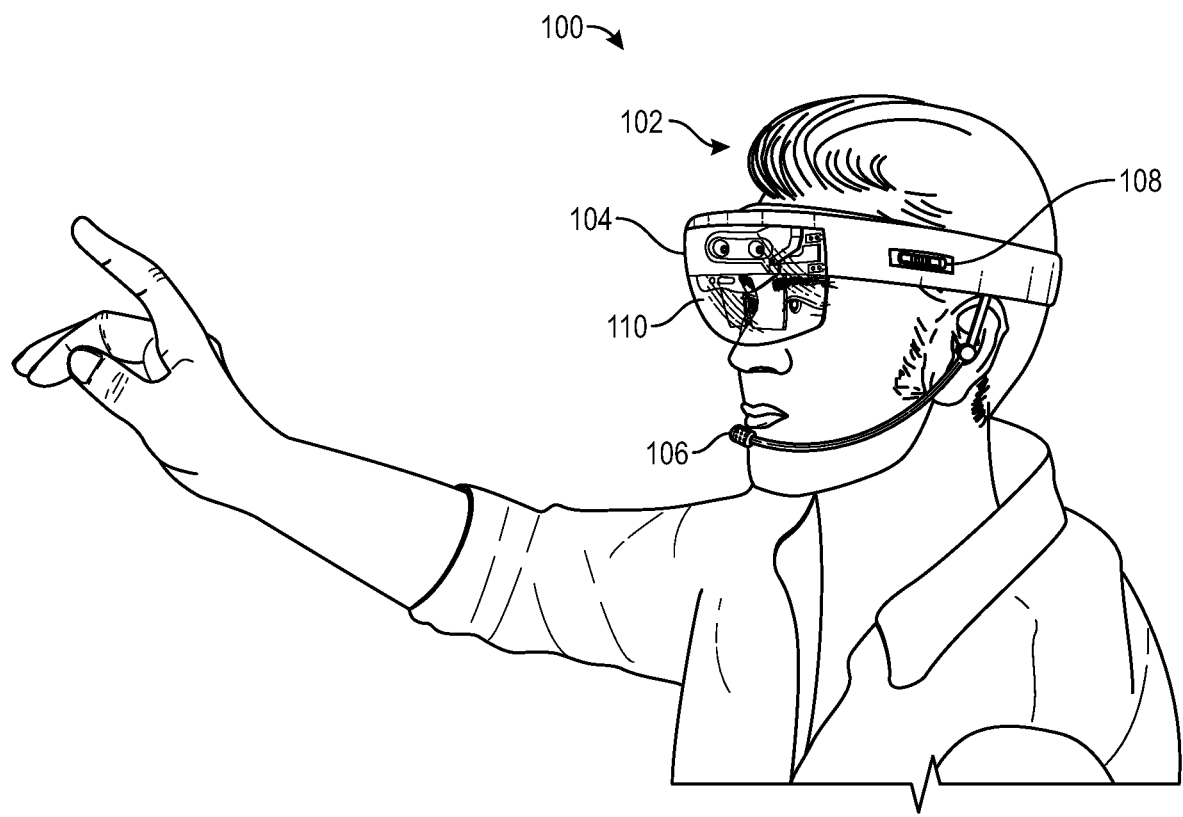
FIG. 1 illustrates a technician with a headset used with a service ecosystem according to an embodiment of the disclosure.

FIG. 1 illustrates a technician 102 with a headset 104 used with a service ecosystem 200 according to an embodiment of the disclosure. The technician 102 can be any technician ranging from a noncertified to a certified technician. A certified technician may be certified through National Institute for Automotive Service Excellence (ASE) for different components in the vehicle such as brakes, transmissions, electrical systems and the like. The technician will be verified using various methods such as logging (user ID and password) into service ecosystem 200 (FIG. 2) or through the use of biometric data (voice, retina, DNA, facial recognition, fingerprint, etc.). The use of biometric data for authenticating/verifying the technician allows service ecosystem 200 to properly identify the technician including his certification level. This ensures that a certified technician works on the vehicle in order to comply with warranty requirements or safety regulations. If the technician is not authenticated/verified, then the vehicle service will not be allowed to proceed.

The headset 104 includes a combination microphone and earpiece (or alternatively separate components) 106, a camera 108 (or alternatively a separate component, e.g. flashlight with WiFi and built in camera) and safety glasses 110. The combination microphone and earpiece allows for the technician to use voice activation to request information, interact with the service ecosystem, to control other remote computing devices, authenticate the technician, or to speak to another repair personnel such as another technician or service advisor and the like. Further, voice activation can be used to query information in the service ecosystem 200 or to command functions such as advancing or returning to a webpage and the like.

The camera 108 can be utilized to take images such as components of the vehicle, and other repair personnel. The camera 108 can be positioned anywhere on the headset so long as it is positioned to take a technician's desired image. The images may be used in different ways including images of components that need to be replaced to show to the customer in order to get permission to conduct the repair or to use with image recognition software in order to identify the component using a remote database. In another embodiment, the image may be of a repair personnel such as a technician to allow one technician to verify/authenticate the other technician or the image may be a "selfie" of the personnel using the headset in order to self-verify/authenticate.

The glasses 110 can act as a display of information to the technician or as an input device. The information displayed can include the checklist of a multi-point inspection, repair procedures, instructions, component diagrams, manuals, warranty information, multimedia (e.g. video), augmenting items and the like. The glasses 110 can also be an input device such as a touchscreen or a biometric device (e.g. fingerprint scanner) for verification/authentication of the technician. The touch screen functionality (e.g. similar to a mouse) may be used, for example, to verify that a part of checklist has been performed, send the captured image, or to advance to a next screen of information or return to a former screen of information and the like.

It should be noted, that the headset 104 includes the necessary components (not shown) such as a microprocessor, memory that stores software (operating, imaging, voice recognition, communications, protocols, diagnostic, data processing, database, signal processing, etc.), and firmware, and a wireless communication interface (e.g. audio, video, data transmissions) that allows the handset to communicate with a remote device (e.g. server, wireless devices, computing devices, etc.). In one embodiment, the wireless communication interface may also detect the RFID badge affixed to the technician or other service personnel. In another embodiment, the wireless communication interface may include GPS or location determination software to allow the technician to be located in the dealership by the service ecosystem 200.

Figure 2:
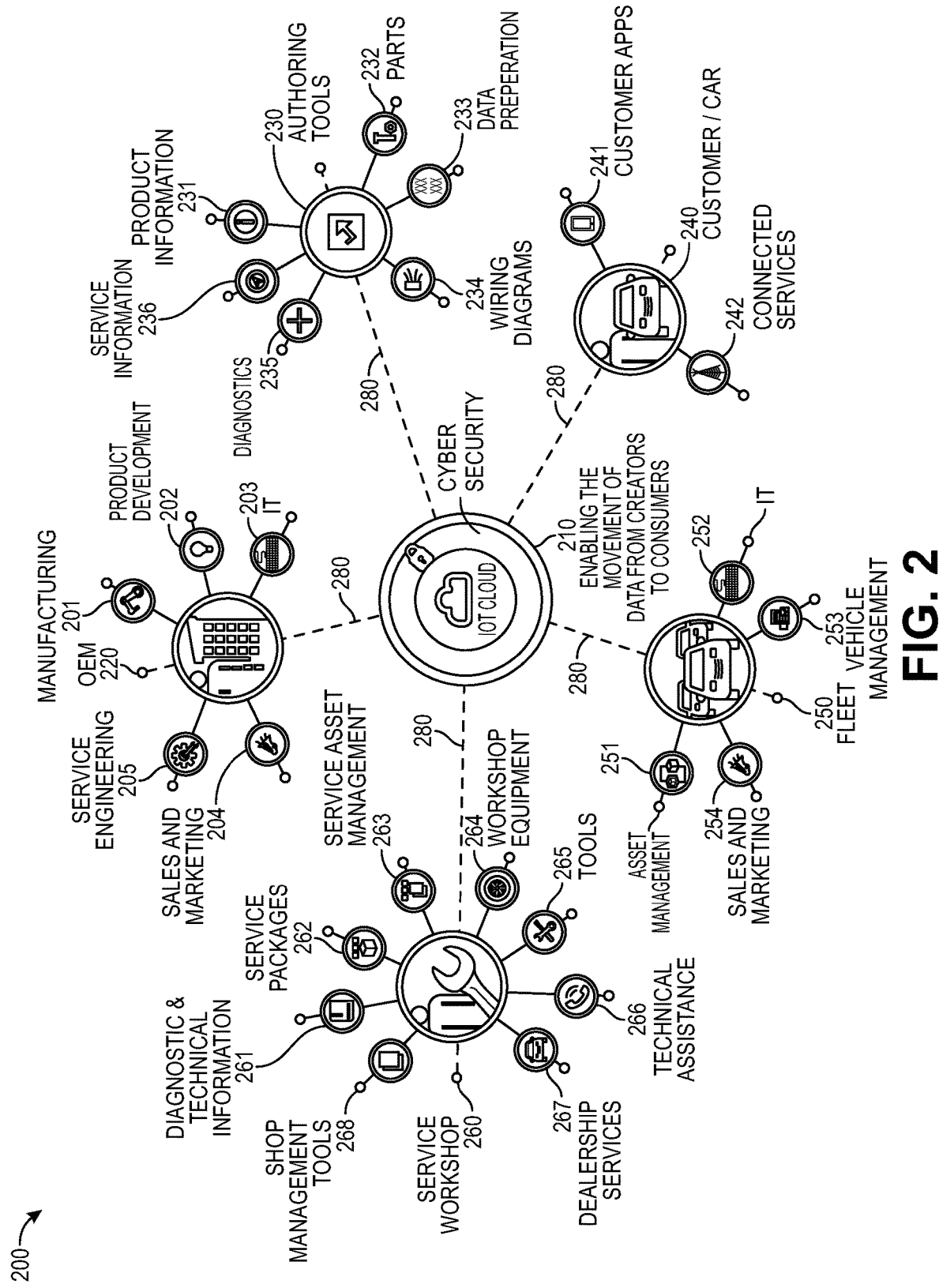
FIG. 2 illustrates the major components of the service ecosystem according to an embodiment of the disclosure.

FIG. 2 illustrates the major components of the service ecosystem 200 according to an embodiment of the disclosure. The major components include the cloud 210 (e.g., Internet, distributed network), original equipment manufacturer (OEM) 220, diagnostic software 230, customer vehicle 240, fleet 250 and service center 260 that may be interconnected through a communication connection 280 (wired or wireless). The communication connection 280 allows for two-way communication and allows each component of the service ecosystem 200 to communicate with each other.

Components of OEM 220 may include manufacturing 201 such as a vehicle or components including repair parts of vehicle and product development 202. Typically OEM will have its own IT system 203 to store various information and allow communication within and external to the OEM. The OEM further includes a sales and marketing team 204 and service engineering 205 where various diagnostics and fault codes may be classified for the OEM's vehicles.

Diagnostic software 230 may include product information 231 related to the vehicle and its components, parts database 232, data preparation 233, wiring diagrams 234, diagnostics 235 (fault code, fixes, etc.), service information 236 (fixes, bulletins, warranty, etc.) and the ability to author diagnostic fixes. The diagnostics 235 is not a static database but is continuously updated via difference sources including crowdsourcing, updates, machine learning, chat rooms, web site, blogs, and the like. Thus, diagnostics 235 is robust and adaptable to an ever changing diagnostic environment. Service information 236 is also not a static database but is continually updated similar to diagnostics 235 so that the most up-to-date and relevant servicing steps are available to quickly diagnose and repair the vehicle. Thus, as further discussed below, fixes that are determined at one service center can be shared with others.

Customer vehicle 240 may be any type of vehicle and may include in the vehicle's entertainment system, customer selected apps 241 such as GPS, radio, XM® radio and connected services 242 may include various directories (shopping, restaurants, entertainment, etc.) or music services. Similarly, fleet 250 includes various vehicles including automobiles, trucks, ships, trains, motorcycles, vans, and the like. Fleet 250 further includes asset management (software and database) 251, IT system 252, vehicle management (database and software) 253, and sales and marketing teams 254.

Figure 3:
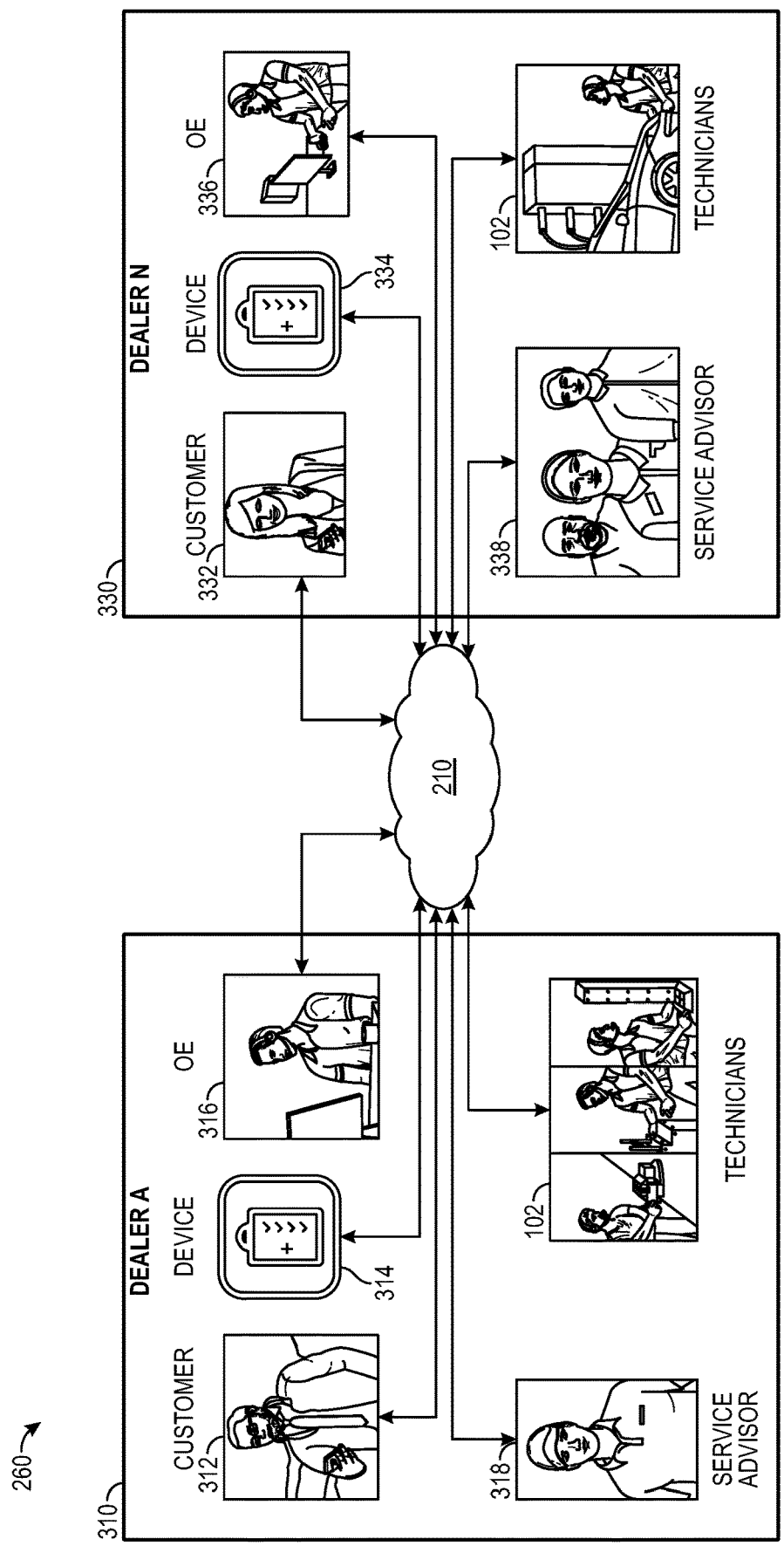
FIG. 3 illustrates some components of the service ecosystem according to an embodiment of the disclosure.

Service center 260 can be located as a standalone garage or located in a dealership (as discussed in FIG. 3). The service center 260 can include diagnostic and technical information (software and database) 261, service packages 262, service asset management (database and software) 263, various workshop equipment 264, tools 265, technical assistance 266, dealership services 267, and shop management tools (database and software) 268.

FIG. 3 illustrates some components of the service ecosystem 200 according to an embodiment of the disclosure. The service center 260 can include one dealership service center such as Dealer A, 310 or may include multiple dealership service centers such as Dealer A, 310 and Dealer N, 330. Although a dealership service center is shown, any facility that conducts vehicle service can utilize the service ecosystem 200 as discussed herein.

Dealer A, 310 may include one or more of the following personnel such as the customer 312, an original equipment advisor 316, a service advisor 318, and a technician 102 in its facility at any one time as part of service center 260. Dealer A 310 may also include a computing device 314 and/or headset 104 that can be used by the customer 312, an original equipment advisor 316, a service advisor 318, and a technician 102 to communicate with the cloud 210. The customer 312 may be a driver or a fleet manager that needs his vehicle to be serviced by Dealer A 310. The customer 312, through the computing device 314 (Dealer A or personal), may provide the cloud 210 with various identification (vehicle, self, etc.) information (e.g. address, contact, vehicle identification number, etc.), repair or service requests including appointment time and date, and payment information ahead of bringing in the vehicle. The computing device 314 may be any computing device including smart phone, tablet, laptop, desktop that may transmit and receive data via a wired or wireless connection.

The original equipment advisor 316 may via the computing device 314 provide information related to the vehicle being serviced such as warranty information, available parts information, manuals, diagrams, repair instructions, top fixes information, authorization to repair, service bulletins, recalls and the like. The service advisor 318 may be considered the "quarterback" of the service center 260 as he interacts with the various personnel including customer 312, original equipment advisor 316, and technician 102 to make sure that the repair/maintenance is on schedule and within the estimated costs. Further, the service advisor 318 ensures that the customer 312 is happy with service and makes the payment for the service.

The cloud 210 may include one or more diagnostic processors located in computing devices, servers, clients and the like. It should be noted that the computing devices may be located locally in the dealership, in a data center or located in various locations but are networked (wire or wirelessly) together in order to communicate with each other. The computing devices may contain vast amount information, including databases (vehicle, technician), software including machine learning or artificial intelligence, predictive analysis, vehicle diagnostic software, identification, authentication including technician (biometric data) and vehicle, repair instructions, top fixes, maintenance instructions, multi-inspection checklist, parts information, parts dealers, shop equipment and resources availability, map of the repair facility (including various repair bays) and the like. Further technician information such as previous skills of the technician, time to complete a certain repair or maintenance, certifications, special vehicle repair knowledge, availability including work hours and current repair or maintenance project and the like are also stored in cloud 210.

The cloud 210 may communicate with the various personnel such as the technician 102 or service advisor 218 via voice activated systems according to an embodiment of the disclosure. That is, through the voice activated system, the technician can request information from the cloud 210 and the cloud 210 can respond by sending the request information via voice or display. Further, the cloud 210 may also instruct the technician step-by-step in order to perform an inspection or repair.

Through the use of the cloud 210, service ecosystem 200 can schedule the appropriate technicians including time availability, level certification, including identifying other technicians as needed to load balanced the service depending on how far off the current repair status to the estimated service completion time. For example, typically 2 technicians may be assigned to perform the multi-point inspection, and the service ecosystem 200 knows when the vehicle is scheduled to be returned to the customer, he can schedule a technician that may be 80% efficient with another technician that is 120% efficient for that type of inspection. Thus, ensuring that the customer will receive his vehicle back at the agreed time so that the customer can schedule the vehicle back in use. This is important to fleet managers such as for Federal Express who must have their vehicles back on time so that deliveries can be made on schedule or they risk losing the work to UPS. In another embodiment, should the service ecosystem 200 detect that the multi-point inspection will not be completed on time, it can assign another technician with the appropriate level of availability, certification and efficiency in order to load balance the service and to have it completed on time.

As noted above, the headset 104 may be used to authenticate the technician and thus ensuring the right technician with the appropriate level of certification for the service is scheduled. However, there are times when the non-certified technician is located, for example, in the oil change pit but is in the position to notice that the transmission has a hole on its outer surface but is not qualified to work on transmissions. The service ecosystem 200 can instruct the non-certified technician to take a picture of the transmission and then send that image to a second technician that is transmission certified for review. The second technician can identify the issue and then inform the service advisor 318 of the issue including cost and estimated time of repair and ask the service advisor to obtain approval for repairs from the customer 312. It should be noted, that the second technician may be part of the two-man team, or located in a different bay or even remotely.

The service center 260 being part of the service ecosystem 200 interacts with the technician during vehicle service. In one embodiment, the service ecosystem 200 can push data to the headset 104 or a display in the Dealer A 310 or both, various steps or instructions to the technician 102 in order for the Technician to perform the vehicle service. Further, workshop manuals, service information, diagrams wiring diagrams, movies and other pertinent technical service information may also be shown during the vehicle service. Information may also be requested "on demand" by the technician to the service ecosystem 200 and displayed, such as a certain procedure to remove a part that is in obstructing service that was not part of the original service procedure. If the service ecosystem 200 does not have the required information, it may scour the Internet for additional information or posts to appropriate bulletin boards in order to obtain crowdsourcing information.

The service ecosystem 200 can be utilized by the service advisor to provide an accurate estimate in terms of completion time and potential costs. The service ecosystem 200 can provide this information including how long the service should be and the associated cost because it has information regarding availability of technicians, shop resources, and parts. For example, for brakes service, the service ecosystem 200 knows the availability of the technicians including certified technicians, availability of the shop resources including repair bays, and lift devices and the availability of brake pads, brake drums and the like for the vehicle being serviced.

The status of the service may also be maintained by the service ecosystem 200 and accessible by the service advisor 318, customer 312 and the original equipment advisor 316 at any time. The service ecosystem 200 can provide updates in real time in the event that the service is behind or even ahead of schedule. The updates may be provided via text, email, fax, page, SMS, video, voice, and the like to the computing device 314 accessible by the service personnel (service advisor, technician, original equipment personnel) and the customer.

Similar to Dealer A 310, Dealer N 330 may include one or more of the following personnel such as the customer 332, an original equipment advisor 336, a service advisor 338, and a technician 102 in its facility at any one time as part of the service center 260. Dealer N 330 may also include a computing device 314 and/or headset 104 that can be used by the customer 332, an original equipment advisor 336, a service advisor 338, and a technician to 102 to communicate with a cloud 210. Dealer N 330 is operated in the same manner as Dealer A 310 (and is not further described) but is shown so that the information is collected by the cloud 210 can be shared. For example, technician 102 that works mainly in Dealer N 330's repair facility can also transfer to Dealer A 310 and his information such as certification level, efficiency, personnel records, and the like can be seamlessly transferred or access at Dealer A 310. And thus, if technician 102 returns to work at Dealer N 330, then his information including improved efficiency or decreased efficiency accumulated while working at Dealer A 310 can be transferred or accessed at Dealer N 330. With connected Dealer A and Dealer N and other dealerships, crowdsourcing of information can naturally occur including repairs that was discovered to work on the specific vehicle when traditional repairs technique did not solve the issue.

Figure 4:
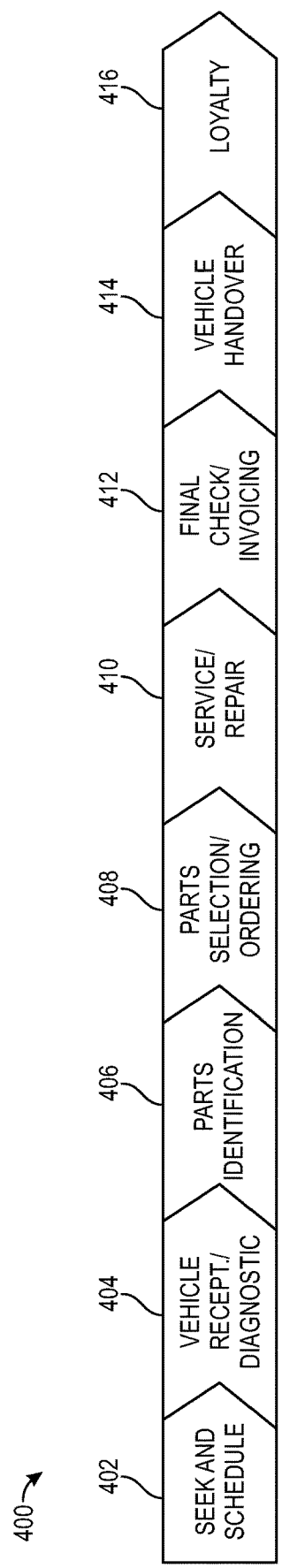
FIG. 4 illustrates a service process flow according to an embodiment of the disclosure.

FIG. 4 illustrates a service process flow 400 according to an embodiment of the disclosure. At step 402, as noted above a customer will seek a service center and make a schedule 402 in order to have their vehicle serviced. The service center can be found via a search engine and can be based on various criteria such as location and services provided. The customer can schedule the service via the webpage or via the telephone. At step 404, the vehicle can be received and diagnostics on the vehicle may be performed. Once the diagnostic is completed, at step 406 suggested fix including necessary replacement parts will be identified. At step 408, the replacement parts can be ordered (if not available at the service center) and delivered. At step 410, the technician can perform the service or repair on the vehicle. At step 412, a final check of the vehicle and invoicing of the service may occur. At step 414, the vehicle is returned to the customer and if the customer is satisfied with the service and the interaction, then at step 416, the service center has obtained loyal customer.

FIG. 5 illustrates a servicing method 500 using the service ecosystem according to an embodiment of the disclosure. In one embodiment, the servicing method 500 is an express service oil change and tire rotation using two or more technicians (TA, TB, . . . TZ). A multi-point inspection is also part of the express service. At this point, TA and TB are the assigned technicians and are wearing the headset 104 that are connected to the cloud 210. When connected, TA and TB can communicate with each other or with other personnel and computing devices that are connected to the cloud 210. The communication may be via voice, messaging, data, video and the like. Although the interactions described herein between the technician and the cloud 210 is via voice activation or communication, the interaction may also be partly visual such as displays of words and media on the headset or remote monitor (seen by the technicians).

At step 502, TA communicates with BEST (cloud 210) in order to login. TA via voice says "Tech 6128A here." TA may be logged in and authenticated via biometric systems including voice, fingerprint, facial recognition, retina scan, DNA, and the like or through scanning of his RFID badge. At step 504, BEST authenticates TA and verifies the certification level of TA. BEST responds with "morning John, ready to go." At step 506, TB communicates with BEST in order to login by saying "Tech 324B logging in." The technicians do not have to wait for each other to login and can login simultaneously. At step 508, BEST authenticates TB and verifies the certification level of TB. BEST responds with "morning Melanie, we're ready to go." At this point, BEST is able to determine the location of the technicians TA and TB using the locations of the headsets 104 (GPS or location determination on the wireless signals) and knows that they are in the express service bay and thus verify that they are certified to work on the services that are typically performed in the express service bay.

At step 510, TA can initiate work sequence to identify the vehicle by saying "express service basic for VIN 1VT34E265AWC34." At this point, BEST creates an express service record that may be displayed on a remote display in the dealership or in the repair bays so that status of the service will also be known to the service advisor 318, customer 312, original equipment advisor 316 and others connected to the cloud 210. This information is also displayed on computing device 314 in real time. In one embodiment, the VIN of the vehicle is conveyed using the camera 108 on the headset 104.

At step 512, BEST confirms in the background that this is the correct service assigned by the service advisor and responds to TA and TB with "vehicle is Subaru Impreza WRC-2016 model year." This allows TA and TB to also verify that this is the correct vehicle that they should perform the service on. If not, the express service will be stopped by BEST. At this point, BEST can search various databases for any recalls or technical bulletins related to the identified vehicle and forward this information to the technicians.

If it is the correct vehicle, at step 514, BEST instructs TA to "check the front wipers," and at step 516, instructs TB to "check the rear wipers." It should be noted that these instructions may be sent by BEST to TA first or to TB first or at the same time depending on the different embodiments of the disclosure. In one embodiment, BEST monitors each step of the express service and when the step is completed, it can determine whether the service will be completed on time or if the customer would have to be notified of the status change. If the completion time will not be met, then BEST can shift some of the steps from one technician to another or request an additional available technician to help.

Once TA completes the front wipers inspection, at step 518 TA may respond with "front wipers good." At step 520, TB may respond with "rear wipers worn." At step 522, BEST would like additional details as the customer and advisor may request proof that the rear wipers are actually worn and thus instructs TB to "please take a picture of the worn wiper." In another embodiment, TB took the picture and responds with "rear wipers worn." Results of the various inspections can be displayed on the remote display or computing device 314 so that the service advisor 318 and the customer 312 have a snapshot of the progress of the service.

At this point, BEST may notify the service advisor 318 and the customer 312 to get all approvals to replace the rear wipers or it can wait until additional repairs are needed to get approval at one time versus every time a repair is identified. In another embodiment, BEST only notifies the service advisor 318 so that he knows that additional repairs would be needed but at this point not bothering the customer.

At step 524, as previously instructed by BEST (not shown), TA checks the driver's front brake pad and states "driver's front brake pad reading 2/16" and takes a photo of the brake pad. If the brake pads are under warranty, the original equipment manufacturer may require evidence via an image before it will pay for any warranty service. At step 526, BEST can notify service advisor 318 that "express service-repair order (RO) #3429 requires customer approval to proceed." At this point, BEST has determined whether the parts are available including when it will be available, whether TA or TB is qualified to replace the brake pads and how much time it would take to replace, and pricing of the brake pads. Additionally, BEST can also communicate with the original equipment advisor to confirm that the replacement brake pads are the correct ones for the Subaru to ensure they conform to any warranty on the vehicle. Further, this would be an ideal point in the express service to replace the brake pads as the wheels are off of the vehicle and thus, the repair request may be sent for approval.

At step 528, the service advisor may review the repair order by stating "open RO#3429 on my iPad" to BEST. At this point, the service advisor 318 may then visit with the customer 312 in person or via telephone or video about the work needed. Further, at step 530, information including the changes to the completion time, costs of the parts and labor, photos of the worn parts and other relevant information may be texted (with or without external links) or sent via email for the customer's review on the customer's computing device. At this point, in one embodiment, the customer 312 can select approve, decline, or service advisor needed. At step 532, the service advisor 318 reviews the selection by the customer 312 and determines whether he needs to take any other actions including talking to the customer further.

At step 534, BEST informs TA that the brake pad replacement is approved by stating "replace front brakes." BEST updates the completion time, if needed, and the approved work is added to the repair order. At step 536, BEST or the technicians have determined that the express service is completed and BEST informs the technicians their time of completion for their records. Additionally, BEST may also notify the service advisor and customer the completed service. At any point, the customer can remotely pay for the service as she has been updated in real time of all the necessary repairs and associated costs. In another embodiment, the customer can pay when she picks up the vehicle.

In one embodiment, at this point, BEST can also update its information about the technician such as the time in which it takes that technician to complete a step so that BEST can determine in the future what tasks should be assigned to that technician based upon completion time of each step. At step 538, TA takes the Subaru back to the customer holding area and at step 540, BEST or the service advisor notifies the customer the vehicle is ready for pickup and location of the vehicle (parking spot 4).

It should be noted that the steps described herein may be performed in any order and unnecessarily sequentially as described. Further, the present disclosure can be realized as computer-executable instructions on computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present disclosure can include the computer-readable medium having stored thereon a data structure including a plurality of fields containing data representing the techniques of the present disclosure.

Although specific exemplary aspects of the disclosure have been described, internal and external components and configurations may be implemented in reverse to provide the same benefits provided by the inventive aspects described. In addition, it will be appreciated by one skilled in the art that other related items can be incorporated and used along with aspects derived from the disclosure.

The many features and advantages of the disclosure are apparent from the detailed specification, and thus, it is intended by the appended claims to case all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

We claim:

1. A service ecosystem for vehicle service, comprising:
    a first and second head set each including a microphone, an ear piece, glasses, a camera and a wireless communication interface, where in the glasses includes a display that displays information;
    a distributed network that communicates with the first and second head set, wherein the distributed network includes vehicle diagnostic databases including repair and maintenance instructions, and technician information including vehicle service certification level and performance efficiencies for various vehicle repair services, and wherein the distributed network includes a diagnostic processor that is configured to:
        receive a first biometric data of a first technician from the first head set;
        receive a second biometric data of a second technician from the second head set;
        confirm the first and second technician's respective identification and respective vehicle service certification level to perform a scheduled service on the vehicle based on the first and second biometric data;
        provide vocal step by step instructions for the scheduled service via the ear piece or visual step by step instructions for the scheduled service via the display to the first and second technician to perform a scheduled service procedure, wherein a step is assigned to a respective technician based on the vehicle service certification level and an efficiency level of the respective technician for that step;
        receive confirmation from the first technician that a first step of the scheduled service procedure has been completed;
        determine whether a second step of the scheduled service procedure has been completed by the second technician;
        if second step is not completed, reallocate the second step to the first technician;
        determine if the scheduled service procedure will be completed within a predetermined time;
        if the scheduled service procedure will not be completed within the predetermined time, request a third technician to assist with the scheduled service procedure or load balance between the first and the second technician by sending or reassigning an assigned step; and
        provide a notification if the scheduled service procedure will not be completed in time despite the load balance of the steps in the service procedure.

2. The service ecosystem of claim 1, further comprising a remote computing device communicating with the distributed network.

3. The service ecosystem of claim 1, wherein the diagnostic processor is further configured to:
    request the first technician to take a picture of a vehicle component; and
    send the picture to a third technician with a vehicle service certification level to service the pictured vehicle component.

4. The service ecosystem of claim 3, wherein the diagnostic processor is further configured to: receive an input from the third technician to replace the pictured vehicle component.

5. The service ecosystem system of claim 1, wherein the diagnostic processor is further configured to: request the first technician to take a picture of a vehicle component; send the picture to an owner of the vehicle in order to receive an approval to repair or replace the pictured vehicle component; and receive the approval from the owner to repair or replace the pictured vehicle component.

6. The service ecosystem of claim 1, wherein the diagnostic processor is further configured to:
    request the first technician to take a picture of a vehicle component;
    send the picture to a third technician with a vehicle service certification level qualified to service the pictured vehicle component; and
    receive a confirmation from the third technician that a repair of the pictured vehicle component was done correctly.

7. The service ecosystem of claim 3, wherein the diagnostic processor is further configured to:
    assign the third technician to repair the pictured vehicle component if the first and second technician are not certified for that repair.

8. The service ecosystem system of claim 1, wherein the diagnostic processor further configured to:
    display on a remote display a current status of the service procedure.

9. The service ecosystem of claim 1, wherein the diagnostic processor is further configured to: receive vehicle identification information from the first technician; and identifying the vehicle to the first technician to verify that it is the correct vehicle to perform the scheduled service.

10. The service ecosystem of claim 1, wherein the diagnostic processor is further configured to: receive vehicle identification information from the first technician; and identifying the vehicle to the first technician to verify that it is the correct vehicle to perform the scheduled service; and verify through the wireless communication interface on the first and second head set that the first and second technician are located in the correct service bay.

11. A method of servicing a vehicle, comprising the steps of:
receive, via a diagnostic processor of a distributed network, a first biometric data of a first technician from a first head set;
receive, via the diagnostic processor of the distributed network, a second biometric data of a second technician from a second head set, wherein the first and second head set each including a microphone, an ear piece, glasses, a camera and a wireless communication interface, where in the glasses includes a display that displays information;
confirm with the diagnostic processor of the distributed network linked to technician information, the first and second technician's respective identification and respective vehicle service certification level to perform a scheduled service on the vehicle based on the first and second biometric data;
provide, via the diagnostic processor of the distributed network, vocal step by step instructions for the scheduled service via the ear piece or visual step by step instructions for the scheduled service via the display to the first and second technician to perform a scheduled service procedure, wherein a step is assigned to a respective technician based on the vehicle service certification level and an efficiency level of the respective technician for that step; receive, via the diagnostic processor of the distributed network, confirmation from the first technician through the first head set that a first step of the scheduled service procedure has been completed;
determine, via the diagnostic processor of the distributed network, whether a second step of the scheduled service procedure has been completed by the second technician;
if second step is not completed, reallocate, via the diagnostic processor of the distributed network, the second step to the first technician;
determine, via the diagnostic processor of the distributed network, if the scheduled service procedure will be completed within a predetermined time;
if the scheduled service procedure will not completed within the predetermined time, request, via the diagnostic processor of the distributed network, a third technician to assist with the scheduled service procedure or load balance between the first and the second technician by sending or reassigning an assigned step; and
provide, via the diagnostic processor of the distributed network, a notification if the scheduled service procedure will not be completed in time despite the load balance of the steps in the service procedure.

12. The method of 11, comprising the steps of:
request, via the diagnostic processor of the distributed network, the first technician to take a picture of a vehicle component; and
send, via the diagnostic processor of the distributed network, the picture to a third technician with a vehicle service certification level to service the pictured vehicle component.

13. The method of claim 12, further comprising the step of receive, via the diagnostic processor of the distributed network, an input from the third technician to replace the pictured vehicle component.

14. The method of claim 11, further comprising the steps of:
request, via the diagnostic processor of the distributed network, the first technician to take a picture of a vehicle component; send, via the diagnostic processor of the distributed network, the picture to an owner of the vehicle in order to receive an approval to repair or replace the pictured vehicle component; and receive, via the diagnostic processor of the distributed network, the approval from the owner to repair or replace the pictured vehicle component.

15. The method of claim 11, further comprising the steps of: request, via the diagnostic processor of the distributed network, the first technician to take a picture of a vehicle component; send, via the diagnostic processor of the distributed network, the picture to a third technician with a vehicle service certification level qualified to service the pictured vehicle component; and receive, via the diagnostic processor of the distributed network, a confirmation from the third technician that a repair of the pictured vehicle component was done correctly.

16. The method of claim 12, further comprising the step of assign, via the diagnostic processor of the distributed network, the third technician to repair the pictured vehicle component if the first and second technician are not certified for that repair.

17. The method of claim 11, further comprising the step of display on a remote display a current status of the service procedure.

18. The method of claim 11, further comprising the step of display on a remote computing device a current status of the service procedure.

19. The method of claim 11, further comprising the steps of: receive, via the diagnostic processor of the distributed network, vehicle identification information from the first technician; and identifying, via the diagnostic processor of the distributed network, the vehicle to the first technician to verify that it is the correct vehicle to perform the scheduled service; and verify, via the diagnostic processor of the distributed network, through the wireless communication interface on the first and second head set that the first and second technician are located in the correct service bay.

20. The method of claim 11, further comprising the steps of: receive, via the diagnostic processor of the distributed network, vehicle identification information from the first technician; and identifying, via the diagnostic processor of the distributed network, the vehicle to the first technician to verify that it is the correct vehicle to perform the scheduled service.

* * * * *

UNITED STATES PATENT AND TRADEMARK OFFICE
CERTIFICATE OF CORRECTION

PATENT NO. : 10,708,277 B2
APPLICATION NO. : 15/910469
DATED : July 7, 2020
INVENTOR(S) : Simon Thorley, Diwakar Sathyanarayanan and Shawn Dupuie Page 1 of 1

It is certified that error appears in the above-identified patent and that said Letters Patent is hereby corrected as shown below:

In the Claims

Claim 11, Line 53: please add the word "be" after 'will not'

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*